US006665123B2

(12) United States Patent
Nakajo et al.

(10) Patent No.: US 6,665,123 B2
(45) Date of Patent: Dec. 16, 2003

(54) PROJECTOR

(75) Inventors: Aki Nakajo, Yokohama (JP); Makoto Iida, Kawasaki (JP); Hiroki Kuramoto, Yokohama (JP); Masakazu Ogawa, Yokohama (JP); Tatsumi Hasebe, Hichisou (JP); Yoshie Kodera, Chigasaki (JP); Sadayauki Nishimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/151,041

(22) Filed: May 21, 2002

(65) Prior Publication Data
US 2002/0171938 A1 Nov. 21, 2002

(30) Foreign Application Priority Data
May 21, 2001 (JP) ........................................ 2001-150269

(51) Int. Cl.[7] ............................. G02B 27/14; G02B 5/04
(52) U.S. Cl. ....................................... 359/634; 359/831
(58) Field of Search ................................ 359/634, 819, 359/831, 834, 837; 353/34, 37

(56) References Cited

U.S. PATENT DOCUMENTS 6,072,635 A * 6/2000 Hashizume et al. ........ 359/640
6,101,041 A * 8/2000 Ishibashi et al. ............ 359/634
6,172,815 B1 * 1/2001 Hashizume et al. ........ 359/640

FOREIGN PATENT DOCUMENTS

| JP | 8-184798 | | 7/1996 | |
| JP | 2001-66694 | | 3/2001 | |
| JP | 2002189109 A | * | 7/2002 | ............ G02B/5/04 |

* cited by examiner

*Primary Examiner*—Ricky Mack
(74) *Attorney, Agent, or Firm*—Antonelli, Terry, Stout & Kraus, LLP

(57) ABSTRACT

In a projector, the precision of color synthesis is improved and the generation of vertical stripes in the projected image is suppressed by a dichroic prism used for color synthesis that employs at least the following aspects. (1) The dichroic prism is formed using triangular prisms, in which projections or grooves are provided that have two faces parallel to two pasted faces of the triangular prisms, the projections or grooves being integrally injection-molded on faces of the triangular prisms that are substantially perpendicular to the light beam (i.e., the faces through which no light beam passes); (2) the dichroic prism is positioned using marks on the pasted faces of the triangular prisms; or (3) the dichroic prism is formed by engaging triangular prisms in which recesses or projections are formed.

8 Claims, 8 Drawing Sheets

PROJECTOR

BACKGROUND OF THE INVENTION

The present invention relates to a projector in which light beams of respective colors that are modulated by liquid crystal light valves are synthesized by a dichroic prism, and the light beams are enlarged and projected onto a screen via a projection lens.

Color synthesizing devices used in conventional projectors include dichroic prisms. Ordinarily, in a dichroic prism, four right-angled triangular prisms are pasted to each other in an X-shaped pattern with the right angles of these prisms contacting each other, and reflective films, such as conductive films or the like, that have selective reflectivity for specified colors, are formed on the pasted faces (it will be assumed herein that such reflective films are formed unless otherwise noted).

Currently, glass is the main material used for such right-angled triangular prisms; however, in recent years, prisms formed by injection or compression molding of plastics have begun to be used, as described in Japanese Patent Application Laid-Open No. 2001-66694.

A method used to manufacture such a dichroic prism will be described with reference to FIG. 3.

First, a first triangular prism 19 and a second triangular prism 20 are pasted together on the same plane using the planes 19a and 20a (among the planes on either side of the right angles of the prisms) as reference planes. Then, a third triangular prism 21 and a fourth triangular prism 22 are similarly pasted together.

Next, the unit formed by the first triangular prism and second triangular prism is pasted to the unit formed by with the third triangular prism and fourth triangular prism. However, in this case, since there is no reference plane, it is difficult to align the positions of the vertex parts in each unit so that the prisms are accurately pasted together. As a result, if a positional deviation δ occurs do to inaccurate alignment of the pasted faces (as shown, for example, in FIG. 3), the images of respective colors that are synthesized via the dichroic prism thus obtained will not be aligned on the screen, so that the image quality drops.

A method for accurately pasting the units together to align the vertex positions of the respective prisms in order to eliminate such a drop in the image quality is described in Japanese Patent Application Laid-Open No. 8-184793. In this method, as shown in FIG. 4, a pair of prisms 23 and 24 (among four prisms 23, 24, 25 and 26) are first pasted together so that a step is formed between the two prisms. Furthermore, the remaining pair of prisms 25 and 26 are also similarly pasted together so that a step is formed between the two prisms. Finally, the respective pairs of prisms are pasted together using these step faces 23a and 25a to guide the positioning of the faces so that the vertex parts are in alignment.

SUMMARY OF THE INVENTION

In cases where right-angled triangular prisms made of glass are used, the manufacture thereof includes a polishing process. Accordingly, faces that are perpendicular to the faces through which the light beams pass can easily be formed to have a perpendicular orientation. Consequently, even in the case of conventional techniques, dichroic prisms can be formed with a high degree of precision.

However, in the case of the abovementioned right-angled triangular prisms formed by injection or compression molding of plastics, an inclination of substantially 2 to 5 degrees is generated in connection with the injection from the mold.

If an attempt is made to form a dichroic prism by the method described in Japanese Patent Application Laid-Open No. 8-184793, using right-angled triangular prisms that have such an inclination, the faces that have steps can be aligned, but the directions perpendicular to these faces cannot be aligned.

Accordingly, since the edge lines of the right angles of the four prisms that are pasted together cannot be accurately pasted, the light beams of the respective colors cannot be synthesized with a high precision for each pixel, so that desired colors cannot be reproduced. Furthermore, the edge lines themselves will be projected and displayed as vertical stripes on the image.

It is an object of the present invention to improve the precision of color synthesis, and to suppress vertical stripes in a projected image.

In order to achieve the abovementioned object, the present invention includes the following aspects:

(1) A projector comprising a light source, color separating means for separating the light beam emitted from this light source into light beams of respective colors, light valves which modulate the separated light beams of respective colors, a dichroic prism which synthesizes the modulated light beams of respective colors that have been modulated via the light valves, and a projection lens which enlarges and projects the synthesized modulated light beam onto a screen, wherein the dichroic prism is a prism formed by pasting together four triangular prisms, which are substantially right-angled triangular prisms as seen in cross section, and triangular prisms in which projections or grooves that have two faces forming planes parallel to the two pasted faces are integrally molded in the faces that are substantially perpendicular to the light beams (i.e., faces through which the light beams do not pass) are used as the abovementioned triangular prisms.

(2) A projector comprising a light source, color separating means for separating the light beam emitted from this light source into light beams of respective colors, light valves which modulate the separated light beams of respective colors, a dichroic prism which synthesizes the modulated light beams of respective colors that have been modulated via the light valves, and a projection lens which enlarges and projects the synthesized modulated light beam onto a screen, wherein the dichroic prism is a prism formed by pasting together four triangular prisms, which are substantially right-angled triangular prisms as seen in cross section, and triangular prisms in which marks used for positioning are formed on the pasted faces are used as the abovementioned triangular prisms.

(3) A projector comprising a light source, color separating means for separating the light beam emitted from this light source into light beams of respective colors, light valves which modulate the separated light beams of respective colors, a dichroic prism which synthesizes the modulated light beams of respective colors that have been modulated via the light valves, and a projection lens which enlarges and projects the synthesized modulated light beam onto a screen, wherein the dichroic prism is a prism formed by pasting together four triangular prisms, which are substantially right-angled triangular prisms as seen in cross section, and these triangular prisms are engaged with each other by means of projections or grooves formed in the pasted faces.

DESCRIPTION OF THE PREFERRED EMBODIMENTS

Figure 9:
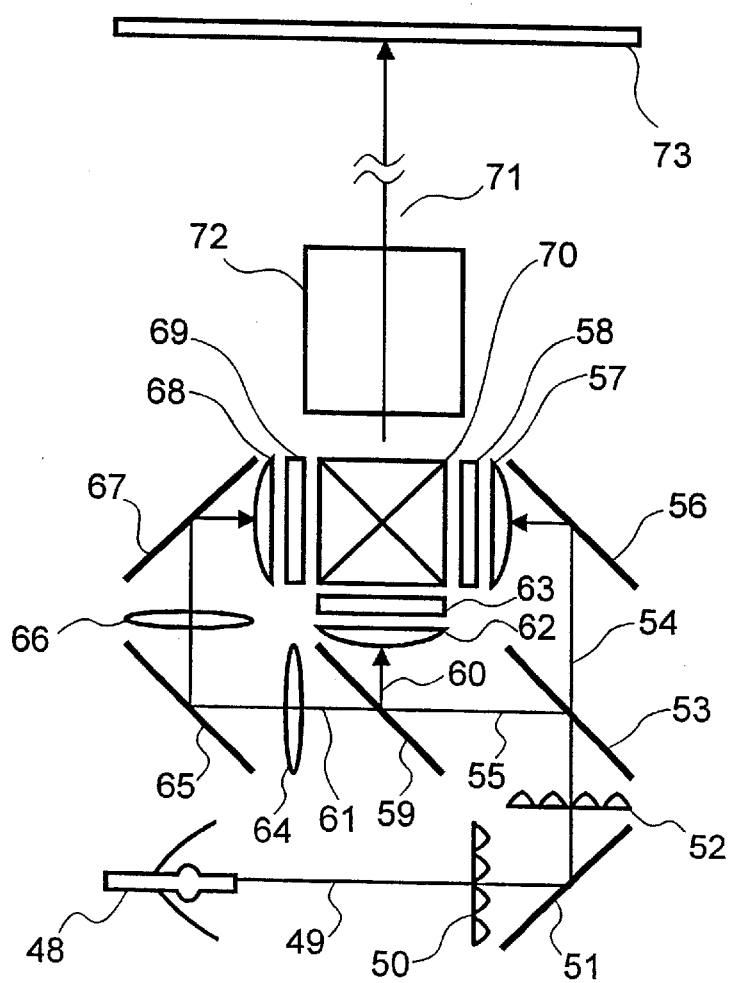
FIG. 9 is a schematic diagram of the optical system used in a conventional projector.

The basic structure of a projector, of the type to which the present invention is applied, will be described with reference to FIG. 9.

The white light beam 49 from the light source lamp unit 48 is converted into a uniform white light beam by a first lens array 50, a cold mirror 51 constituting a first reflective mirror and a second lens array 52, and this light beam is separated into a red light beam 54 and a blue-green light beam 55 by a blue-green-reflective dichroic mirror 53.

The abovementioned red light beam 54 is reflected by a first reflection-amplifying mirror 56; and, this light beam passes through a first focusing lens 57 and is incident on a first liquid crystal light valve 58. The abovementiofled blue-green light beam 55 is separated into a green light beam 60 and a blue light beam 61 by a green-reflecting dichroic mirror 59. The green light beam 60 passes through a second focusing lens 62 and is incident on a second liquid crystal light valve 63.

The abovementioned blue light beam 61 is incident on a third liquid crystal light valve 69 via a first relay lens 64, second reflection-amplifying mirror 65, second relay lens 66, third reflection-amplifying mirror 67 and third focusing lens 68.

Figure 10:
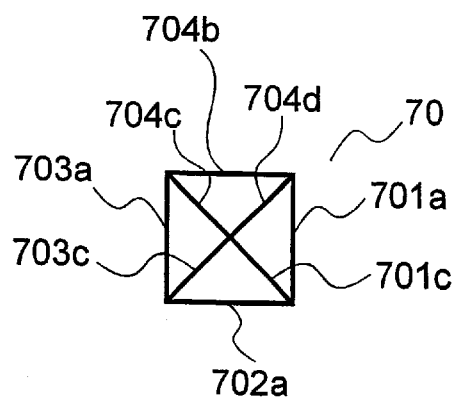
FIG. 10 is a diagram of a conventional color synthesizing prism.

The red light beam containing image information, that is emitted from the abovementioned first liquid crystal light valve 58, is incident on a dichroic prism 70 which has the structure shown in FIG. 10. This light beam enters from the face 701a, is reflected at an angle of 90 degrees by the pasted faces 701c and 704d, and is emitted from the face 704b. The blue light beam containing image information, that is emitted from the abovementioned second liquid crystal light valve 63, enters the abovementioned dichroic prism 70 from the face 703a; and, this light beam is reflected at an angle of 90 degrees by the pasted faces 703c and 704c, and is emitted from the face 704b. The green light beam containing image information, that is emitted from the abovementiofled third light valve 69, enters the dichroic prism 70 from the face 702a; and, this light beam passes through the pasted faces 701c, 703c, 704c and 704d, and is emitted from the face 704b.

The emitted light 71 containing image information, that has thus been color-synthesized, is projected by a projection lens unit 72 and focused as an image on a screen 73.

The embodiments relating to the dichroic prism 70 described below are used in this basic structure.

(Embodiment 1)

Figure 1:
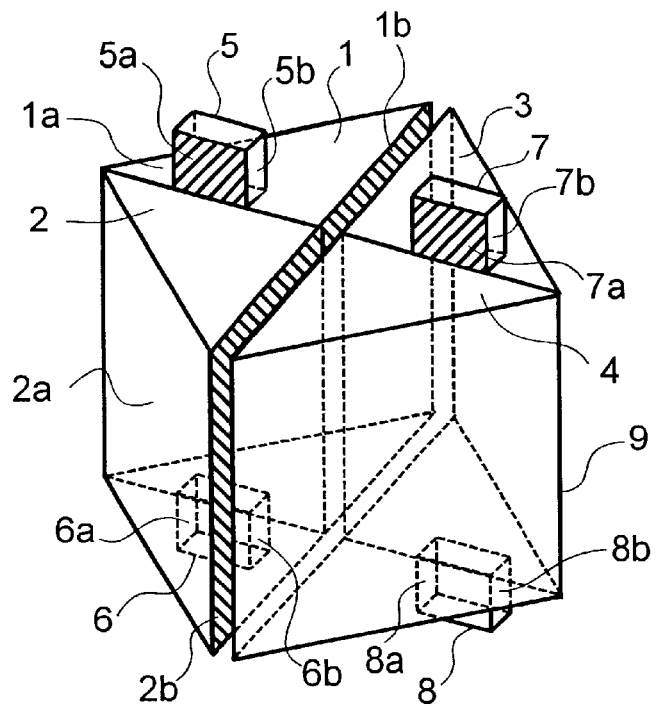
FIG. 1 is a perspective view of a dichroic prism for use in a first embodiment of the present invention.

The dichroic prism 9 shown in FIG. 1 is employed as the dichroic prism 70 shown in FIG. 10.

The dichroic prism 9 is formed in the shape of a square column with a lozenge-form cross-sectional shape, as a result of four triangular prisms made of plastic, which have a triangular column shape and which have equal refractive indices, i.e., a first triangular prism 1, second triangular prism 2, third triangular prism 3 and fourth triangular prism 4, being pasted together using an adhesive agent, so that the edge lines that form approximately right angles (90 degrees±5 degrees) contact each other. Furthermore, since conductive films are formed on the respective pasted faces so that the desired optical characteristics are obtained, there is a gap of approximately 5 $\mu$m or less between the triangular prisms; here, however, the dichroic prism is treated as a square column.

On the first triangular prism 1, as shown in FIG. 1, projections 5 and 6, which respectively have planes 5a and 6a that are parallel to the pasted face 1a and planes 5b and 6b that are parallel to the pasted face 1b, are formed on the two faces which have a right-angled isosceles triangular shape and which are not used for pasting and through which no light beam passes. This shape is manufactured by injection-molding or compression-molding a plastic material.

In the third triangular prism 3, as shown in FIG. 1, projections 7 and 8, which respectively have planes 7a and 8a that are parallel to the pasted face 3a and planes 7b and 8b that are parallel to the pasted face 3b, are formed on the two faces which have a right-angled isosceles triangular shape and which are not used for pasting and through which no light beam passes. This shape is manufactured by injection-molding or compression-molding of a plastic material.

Next, the method used to manufacture the dichroic prism 9 that is formed by pasting together the four triangular prisms using these projections will be described.

First, the first triangular prism 1 and second triangular prism 2 are pasted together so that the pasted faces 1b and 2b are on the same plane. Next, the third triangular prism 3 and fourth triangular prism 4 are similarly pasted together. In this case, pasting is performed using the faces in which the projections form a part of the plane. Then, the dichroic prism is formed by further pasting together these pairs of pasted prisms.

Figure 13:
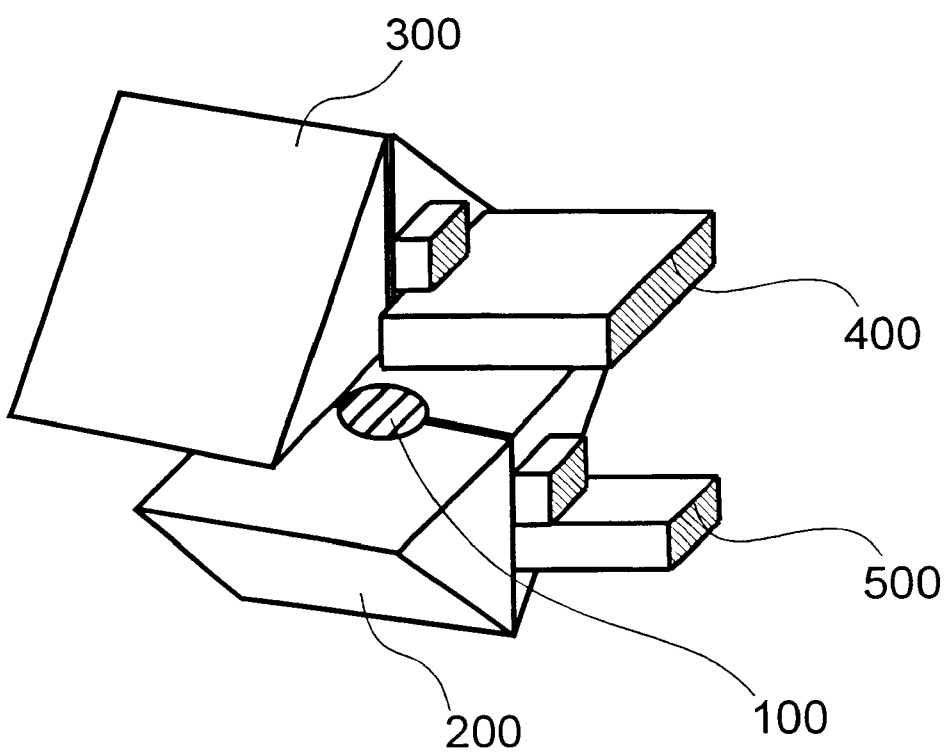
FIG. 13 is a diagram showing the conditions of manufacture of the dichroic prism of the first embodiment.

FIG. 13 is a perspective view that illustrates the pasting process.

First, one plane (plane 7b) of one projection 7 on the one pair of pasted prisms 200 is supported by a positioning jig 500. Only a portion of this jig 500 is shown in FIG. 13; however, one plane (plane 8b) of the projection 8 on the opposite side of the pair of pasted prisms 200 is also clamped and supported by the same jig. The prisms carried on this jig are coated with an adhesive agent 100, and this adhesive agent is spread over the entire surface that is to be bonded.

The projections on the other pair of pasted prisms 300 are also similarly supported in the jig planes (planes 5b and 6b) by a jig 400. Temporary fastening is accomplished by pasting the faces of the pair of prisms 200 and the pair of prisms 300, while fixing the orientation of these prisms by means of the jigs 400 and 500.

Figure 14:
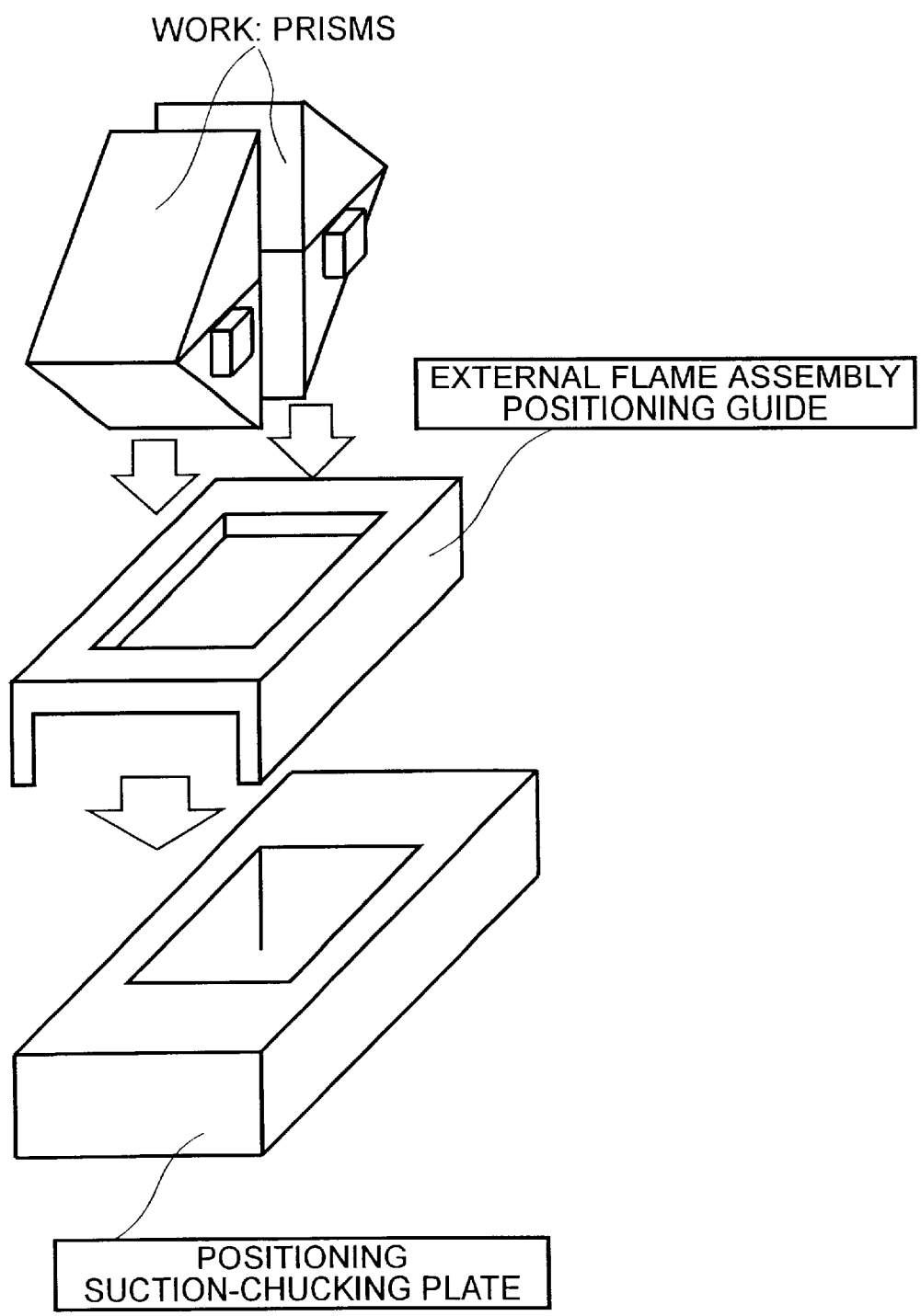
FIG. 14 is a diagram showing the conditions of manufacture of the dichroic prism of the second embodiment.

Next, the temporarily fastened pairs of prisms 200 and 400 are fit into an external frame assembly positioning guide, as shown in FIG. 14, so that the triangular prisms on which the projections are formed are on the bottom. Afterward, the prisms are further accurately positioned by means of a positioning suction-chucking plate; then, the main bonding process is performed.

Even if such projections are formed by injection molding, the areas of the projections are small, so that the projections have little effect on the positioning with the guide; accordingly, highly precise positioning is possible.

Furthermore, even in cases where an arbitrary shape, such as a cylindrical shape or the like, is used for the projections, and the projections are not disposed in positions that are parallel to the pasted faces, pasting can be accurately performed as long as the assembly jig is formed so that this jig corresponds to the shape of the projections. However, from the standpoint of facilitating the manufacture of the assembly jig, it is desirable that the projections be formed in a shape that has faces parallel to the pasted faces.

Figure 11:
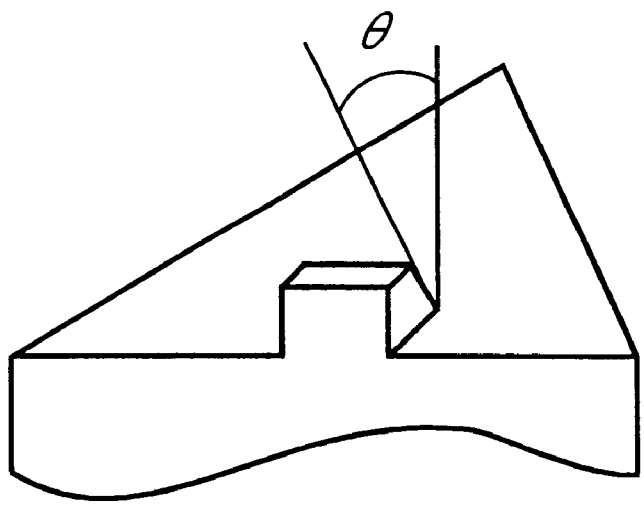
FIG. 11 is a perspective view of part of a triangular prism showing a modification of the first embodiment.

Furthermore, if the triangular prisms are formed such that the projections have an inclination θ as shown in FIG. 11, when the triangular prisms are injection—molded, the triangular prisms will have a mold-release taper when the prisms are separated from the prism-holding molds, so that the triangular prisms can easily be removed from the molds.

Furthermore, if at least one of the faces of the dichroic prism on which light beams are incident is formed with a lens shape, such as a concave shape, convex shape or the like, then the color magnification aberration of the dichroic prism can be corrected.

(Embodiment 2)

Figure 2:
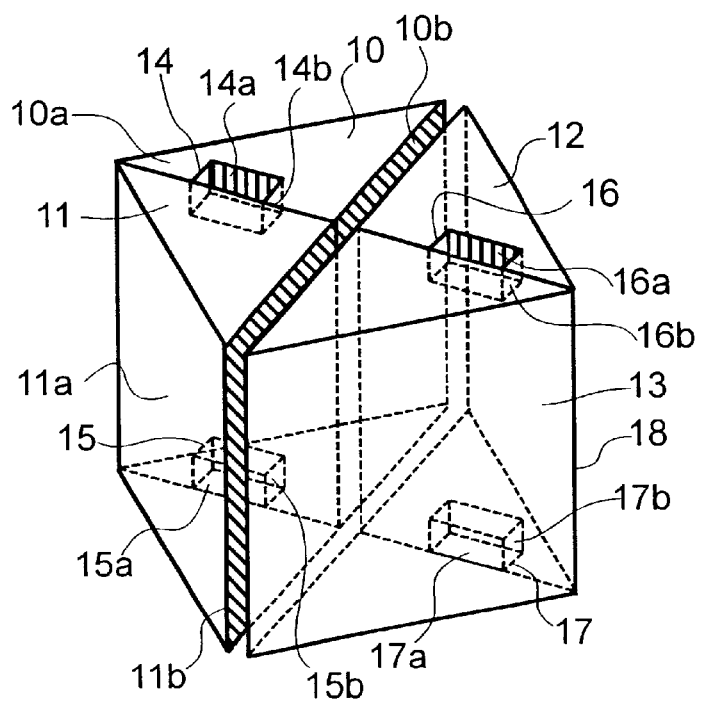
FIG. 2 is a perspective view of a dichroic prism for use in a second embodiment of the present invention.
Figure 3:
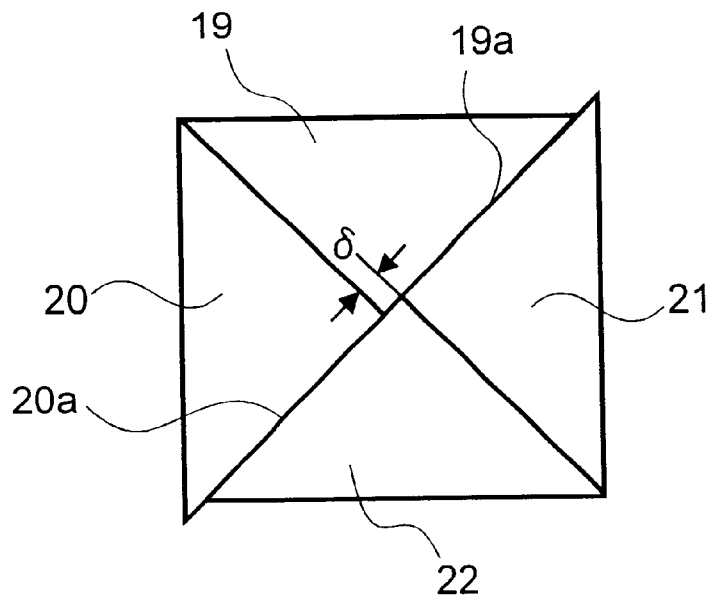
FIG. 3 is a diagram which illustrates an example of positional deviation of the prism unit.
Figure 4:
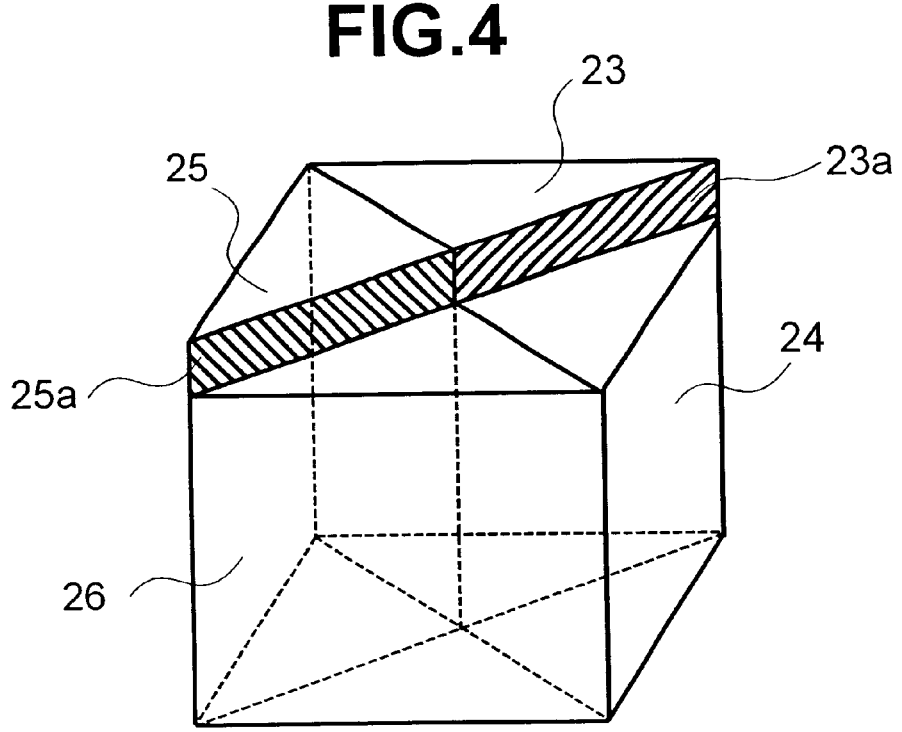
FIG. 4 is a perspective view of a dichroic prism which illustrates the method of pasting employed in a conventional prism unit.
Figure 5:
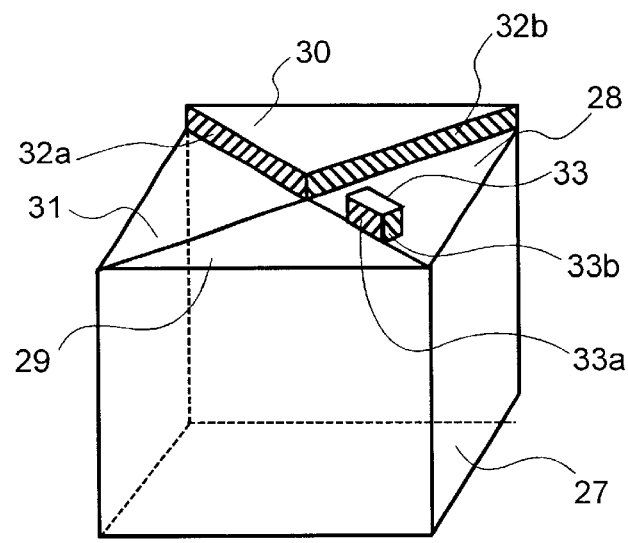
FIG. 5 is a perspective view of a dichroic prism for use in a third embodiment of the present invention.

FIG. 2 is a perspective view of a dichroic prism 18 constituting a second embodiment of the present invention. This dichroic prism 18 is formed in the shape of a square column with a square cross section as a result of four triangular prisms, which have a triangular columnar shape and which have equal refractive indices, i.e., a first triangular prism 10, second triangular prism 11, third triangular prism 12 and fourth triangular prism 13, being pasted together. Furthermore, conductive films are formed on the respective pasted faces so that desired optical characteristics are obtained. In the first triangular prism 10 of this example, grooves which respectively have planes 14a and 15a that are parallel to the pasted face 10a and planes 14b and 15b that are parallel to the pasted face 10b are, formed in the two faces which have a right-angled isosceles triangular shape and which are not used for pasting. Next, the method used for medicinal aerosol formulation of the dichroic prism 18 by pasting together the abovementioned triangular prisms will be described.

First, the first triangular prism 10 and second triangular prism 11 are pasted together so that the pasted faces 10b and 11b are on the same plane. Next, the third triangular prism 12 and fourth triangular prism 13 are similarly pasted together. Afterward, these respective pairs of triangular prisms are pasted together in the form of an X. In the dichroic prism 18 thus obtained by pasting the triangular prisms together, positioning faces 15*a* and 17*a* that are parallel to the positioning faces 14*a* and 16*a* are formed on the lower end, in addition to the positioning faces 14*a* and 16*a*, which are similar to the positioning faces used in a conventional prism. Furthermore, in addition to the positioning faces 14*b* and 16*b* that are perpendicular to the pasted faces, positioning faces 15*b* and 17*b* that are parallel to these positioning faces 14*b* and 16*b* are also formed on the lower end. Accordingly, the four prisms can be accurately pasted together by fitting jigs against these faces.

Furthermore, the dichroic prism of this example, which is pasted together as described above, can be accurately positioned by using the abovementioned grooves 14, 15, 16 and 17 formed in the prisms to attach the dichroic prism to the optical unit in a specified position.

Here, positioning is possible using only the grooves 14 and 15, and pasting can be accurately performed in such a case; however, a larger number of positioning references allows more accurate positioning, so that a larger number of grooves is preferable.

Furthermore, even in cases where the grooves have an arbitrary shape, such as a cylindrical shape or the like, and are not disposed in positions parallel to the pasted faces, pasting can be accurately performed if the assembly jig is formed so that this jig corresponds to the shape of the grooves. However, from the standpoint of facilitating the preparation of the assembly jig, it is desirable that the grooves have faces that are parallel to the pasted faces.

Furthermore, if the prisms are formed with a shape in which the grooves have an inclination θ as shown in FIG. 12, when the prisms are injection-molded, the prisms will have a mold-release taper when the prisms are separated from the prism-holding molds, so that the prisms can easily be removed from the molds.

Furthermore, if at least one of the faces of the dichroic prism on which light beams are incident is formed with a lens shape such, as a concave shape, convex shape or the like, then the color magnification aberration of the dichroic prism can be corrected.

(Embodiment 3)

FIG. 5 shows a perspective view of a dichroic prism 27 constituting a third embodiment of the present invention. The dichroic prism 27 is formed in the shape of a square column with a square cross section as a result of four triangular prisms, which have a triangular column shape and which have equal refractive indices, i.e., a first triangular prism 28, second triangular prism 29, third triangular prism 30 and fourth triangular prism 31, being pasted together. Furthermore, conductive films are formed on the respective pasted faces so that desired optical characteristics are obtained. In the present example, a projection 33 is formed beforehand on the first triangular prism 28. Next, the method used to manufacture the dichroic prism 27 by pasting these triangular prisms together will be described.

First, the first triangular prism 28 and second triangular prism 29 are pasted together. Next, the third triangular prism 30 and fourth triangular prism 31 are pasted together so that steps 32*a* and 32*b* are formed. Afterward, the respective pairs of prisms are pasted together in the form of an X. In the dichroic prism 27 thus formed by pasting the prisms together, positioning faces 32*a* and 33*a*, similar to those in a conventional prism, are formed. In addition, positioning faces 32*b* and 33*b* that are perpendicular to these positioning faces are also formed. Accordingly, the four prisms can be accurately pasted together by placing a jig against these faces.

Furthermore, the dichroic prism of this example, which is pasted together as described above, can be accurately positioned by using the abovementioned projection formed on one of the prisms to attach the dichroic prism to the optical unit in a specified position.

Here, the abovementioned projections formed beforehand on the triangular prisms, the abovementioned grooves formed beforehand in the triangular prisms and the abovementioned steps that are formed when two of the triangular prisms are pasted together may be used as positioning references.

Here, positioning is possible using only the projection 33, and pasting can be accurately performed in such a case; however, a larger number of positioning references allows more accurate positioning, so that a larger number of projections is preferable.

Furthermore, even in cases where the projections or grooves have an arbitrary shape, such as a cylindrical shape or the like, and are not disposed in positions parallel to the pasted faces, pasting can be accurately performed if the assembly jig is formed so that this jig corresponds to the shape of the projections or grooves. However, from the standpoint of facilitating the preparation of the assembly jig, it is desirable that the projections or grooves have faces that are parallel to the pasted faces.

Figure 12:
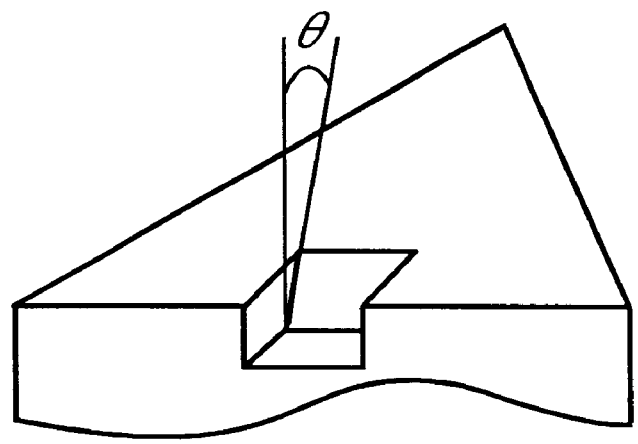
FIG. 12 is a perspective view of part of a triangular prism showing a modification of the second embodiment.

Furthermore, if the prisms are formed with a shape in which the projections or grooves have an inclination θ, as shown in FIG. 11 or FIG. 12, when the prisms are injection-molded, the prisms will have a mold-release taper when the prisms are separated from the prism-holding molds, so that the prisms can easily be removed from the molds.

Furthermore, if at least one of the faces of the dichroic prism on which light beams are incident is formed with a lens shape, such as a concave shape, convex shape or the like, then the color magnification aberration of the dichroic prism can be corrected.

(Embodiment 4)

Figure 6:
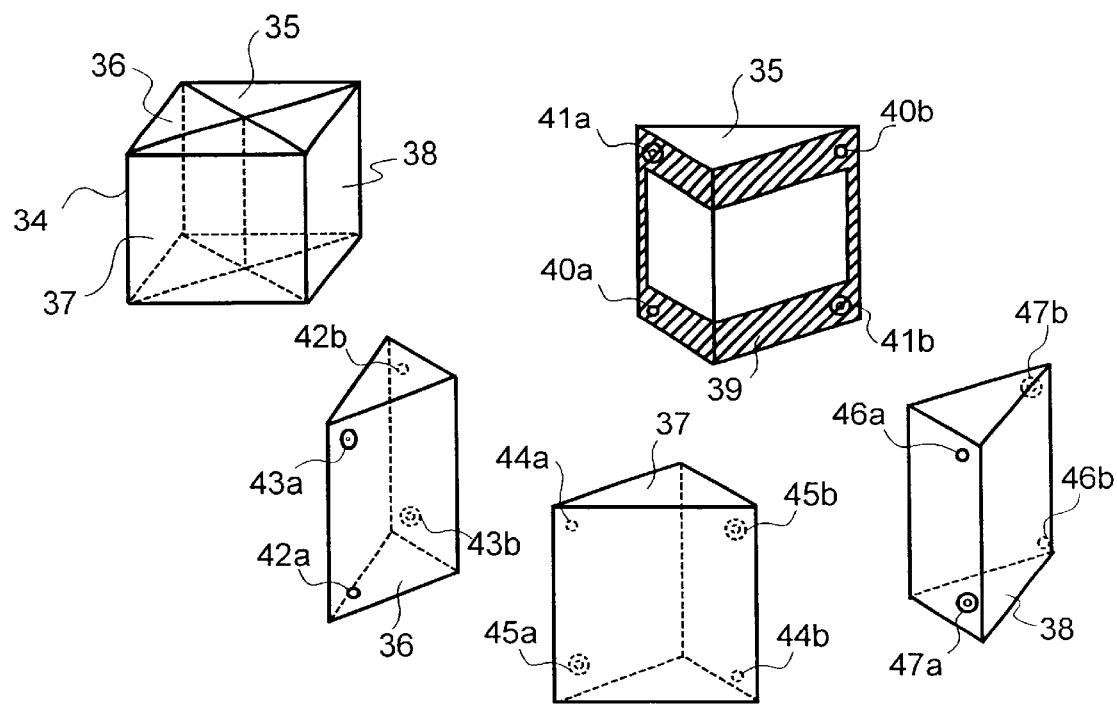
FIG. 6 is a perspective view of a dichroic prism for use in a fourth embodiment of the present invention.

FIG. 6 is a perspective view of a dichroic prism 34 constituting a fourth embodiment of the present invention. This dichroic prism 34 is formed in the shape of a square column with a square cross section as a result of four triangular prisms, which have a triangular column shape and which have equal refractive indices, i.e., a first triangular prism 35, second triangular prism 36, third triangular prism 37 and fourth triangular prism 38, being pasted together. Furthermore, conductive films are formed on the respective pasted faces so that desired optical characteristics are obtained. In the present example, respective projections 40a and 40b and grooves 41a and 41b are formed on the two faces of the right-angled isosceles triangular shape that are used for the pasting of the first prism 35, in areas that are not used for the separation or synthesis of the three colored light beams. Next, the method used to manufacture the dichroic prism 34 by pasting together the abovementioned triangular prisms will be described.

First, the projection 40a and groove 41a of the first triangular prism 35 and the groove 43b and projection 42b of the second triangular prism 36 are aligned, and these prisms are pasted together. Next, the third triangular prism 37 and fourth triangular prism 38 are similarly pasted together, with the projection 44b, projection 46a, groove 45b and groove 47a used for positioning. Afterward, these respective pairs of triangular prisms are pasted together in the form of an X, with the projection 40b, projection 42a, projection 44a, projection 46b, groove 41b, groove 43a, groove 45a and groove 47b used for positioning.

Figure 7:
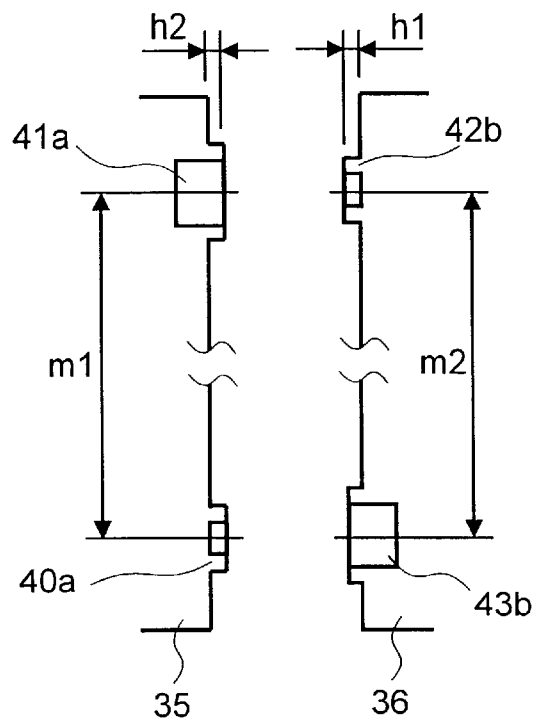
FIG. 7 is a detailed diagram of the projections and grooves used in the fourth embodiment of the present invention.
Figure 8:
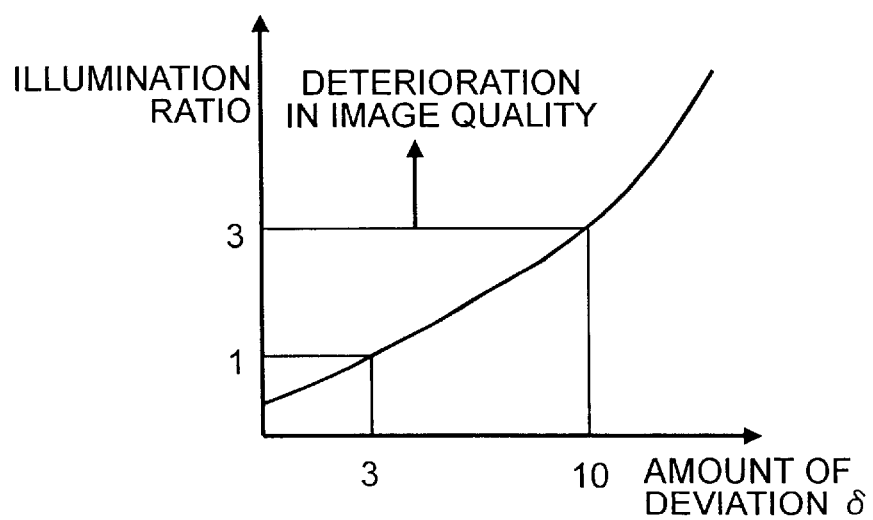
FIG. 8 is a graph which illustrates the relationship between the amount of positional deviation and the illumination ratio in the present invention.

Here, the shapes of the projections and grooves, in a case where the pasting of the first triangular prism 35 and second triangular prism 36 is used as an example, are shown in FIG. 7. The height h1 of the projections 40a and 42b and the height h2 of the grooves 41a and 43b are set at values that are within the thickness of the adhesive layer. Furthermore, positioning can be accurately performed by setting the difference between the distance m1 between the projection 40a and groove 41a of the first triangular prism 35 and the distance m2 between the groove 43b and projection 42b of the second triangular prism 36 at 2 μm or less; setting the difference between the distance m3 between the groove 41a and center line part of the first triangular prism 35 and the distance m4 between the projection 42b and the center line part of the second triangular prism 36 at 2 μ or less; and setting the gap that is formed when the projection 40a and groove 43b engage at 1 μm or less. Furthermore, the first triangular prism 35 and the second triangular prism 36 have the same shape; accordingly, in cases where triangular prisms that are prepared using the same mold are used in combination, the distances m1, and m2 between the respective projections and grooves and the distances m3 and m4 between the projections or grooves and the center line parts are the same, so that more accurate positioning can be accomplished.

Furthermore, accurate positioning can be accomplished even in cases where the projections or grooves have arbitrary shapes, such as square shapes or the like; however, since restrictions caused by the mold release direction are increased in such cases, a cylindrical shape is more desirable.

Here, if at least one of the faces of the dichroic prism on which light beams are incident is formed with a lens shape, such as a concave shape, convex shape or the like, then the color magnification aberration of the dichroic prism can be corrected.

The present invention makes it possible to cause the edge lines of the vertices of the triangular prisms to coincide; accordingly, accurate color synthesis can be performed, and vertical stripes in the projected image can be suppressed.

What is claimed is:

1. A projector comprising:

a light source;

color separating means for separating a light beam emitted from said light source into light beams of respective colors;

light valves which modulate the separated light beams of respective colors;

a dichroic prism which synthesizes the modulated light beams of respective colors that have been modulated via said light valves; and a projection lens which enlarges and projects the synthesized modulated light beam onto a screen;

wherein said dichroic prism is a prism formed by pasting together four triangular prisms which are substantially right-angled triangular prisms in cross section; and said triangular prisms have projections or grooves that have two faces forming planes parallel to two pasted faces of triangular prisms and are integrally molded in faces of the triangular prisms that are substantially perpendicular to the light beams.

2. The projector according to claim 1, wherein two of said two triangular prisms are pasted together so that the planes parallel to said pasted faces are substantially on the same plane.

3. A projector comprising:

a light source;

color separating means for separating a light beam emitted from said light source into light beams of respective colors;

light valves which modulate the separated light beams of respective colors;

a dichroic prism which synthesizes the modulated light beams of respective colors that have been modulated via said light valves; and a projection lens which enlarges and projects the synthesized modulated light beam onto a screen;

wherein said dichroic prism is a prism formed by pasting together four triangular prisms which are substantially right-angled triangular prisms in cross section; and said triangular prisms have marks used for positioning formed on pasted faces thereof.

4. The projector according to claim 3, wherein said marks are formed on both pasted faces.

5. The projector according to claim 3 or claim 4, wherein said marks are formed by projections or grooves.

6. A projector comprising:

a light source;

color separating means for separating a light beam emitted from said light source into light beams of respective colors;

light valves which modulate the separated light beams of respective colors;

a dichroic prism which synthesizes the modulated light beams of respective colors that have been modulated via said light valves; and a projection lens which enlarges and projects the synthesized modulated light beam onto a screen;

wherein said dichroic prism is a prism formed by pasting together four triangular prisms which are substantially right-angled triangular prisms in cross section; and the triangular prisms are engaged with each other by means of projections or grooves formed in pasted faces thereof.

7. The projector according to claim 5 or claim 6, wherein projections are formed on one of the pasted faces, and grooves are formed in the other pasted face.

8. The projector according to claim 5 or claim 6, wherein projections and grooves are formed in one of the pasted faces, and grooves and projections are formed in the other pasted face in positions that allowed engagement with the projections and grooves of said first pasted face.

* * * * *